July 7, 1931.　　　G. H. HUFFERD　　　1,812,876
ECCENTRICALLY ADJUSTED SPRING SHACKLE
Filed April 12, 1929
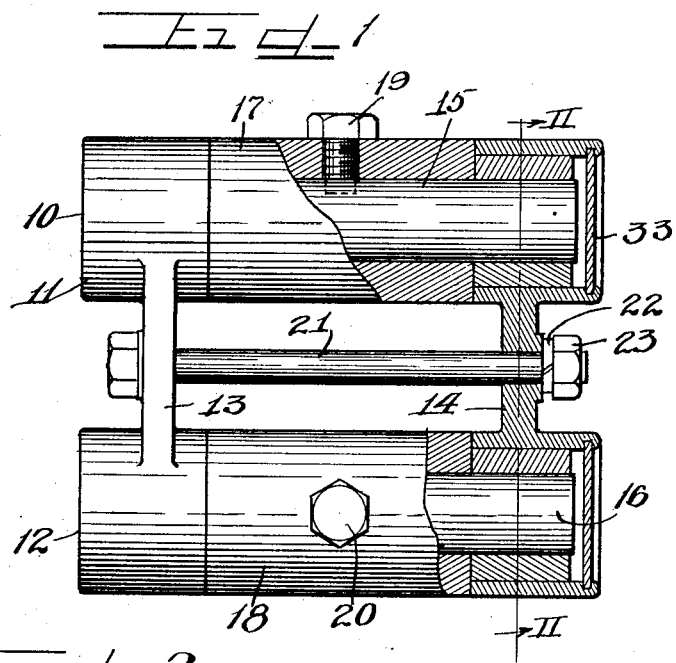
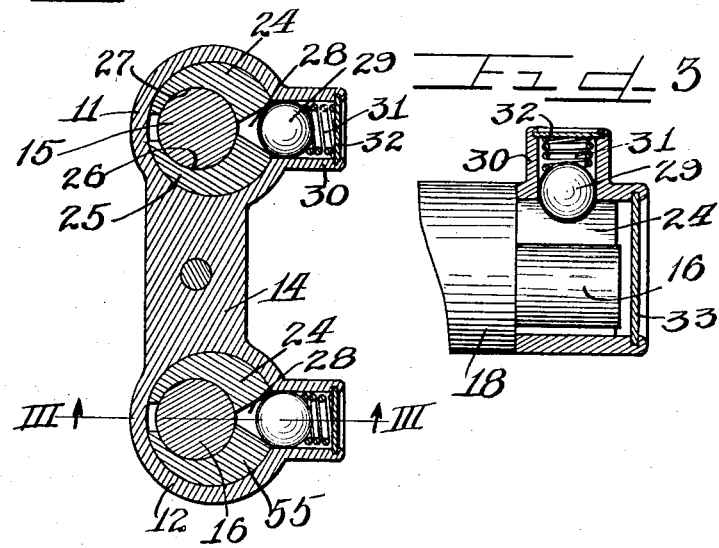
Inventor
George H. Hufferd Patented July 7, 1931

1,812,876

UNITED STATES PATENT OFFICE

GEORGE H. HUFFERD, OF DETROIT, MICHIGAN, ASSIGNOR TO THOMPSON PRODUCTS, INC., OF CLEVELAND, OHIO, A CORPORATION OF OHIO

ECCENTRICALLY ADJUSTED SPRING SHACKLE

Application filed April 12, 1929. Serial No. 354,471.

This invention relates to an eccentrically adjusted spring shackle such as used on automobiles.

It is an object of this invention to provide a spring shackle wherein means are provided for automatically compensating for wear on the bearings.

It is a further important object of this invention to provide an eccentrically adjusted spring shackle having wedge-shaped bearing seats that are automatically maintained in wedging engagement with the shackle bolts.

Other and further important objects of this invention will be apparent from the disclosures in the specification and the accompanying drawings.

This invention (in a preferred form) is illustrated in the drawings and hereinafter more fully described.

On the drawings:

Figure 1 is an end elevational view of an eccentrically adjusted spring shackle of my invention, with parts broken away and in section.

Figure 2 is a sectional view taken substantially on line II—II of Figure 1, with parts in elevation.

Figure 3 is a fragmentary sectional view taken substantially on line III—III of Figure 2.

The reference numeral 10 indicates a shackle embodying the principles of my invention. Said shackle 10 comprises two pairs of alined bearing sockets 11 and 12 integrally joined by shackle links 13 and 14. Shackle bolts 15 and 16 extend between said alined bearing sockets 11 and 12, respectively. A spring eye 17 is mounted upon the shackle bolt 15 and a second spring eye 18 upon the shackle bolt 16 in the usual manner. Bolts 19 and 20 extend through said spring eyes 17 and 18 into the shackle bolts 15 and 16, respectively, to prevent relative rotation. A bolt 21 passing through the spring shackle links 13 and 14 and provided at its outer end with a lock washer 22 and a nut 23 serves to hold the parts of the shackle together.

A pair of spaced, wedge-shaped arcuate bearing seats 24 and 25 is positioned in each of the bearing sockets to provide bearing surfaces 26 and 27, respectively, for the shackle bolts 15 and 16. When so positioned, the bearing seats 24 and 25 present a V-shaped opening 28 between adjacent larger ends of said bearing seats. Into each of said wedge-shaped openings 28 projects a ball 29, partially housed within a cylindrical hollow extension 30 formed integrally with each of said bearing sockets. A coiled spring 31 is positioned against each of the balls 29 and is maintained under compression between the balls 29 and an outer closure member 32 suitably secured in the openings of said hollow extensions 30. The ends of the bearing sockets are likewise closed by suitable disks 33 to prevent the inclusion of dirt and moisture.

The wedge-shaped bearings seats 24 and 25 are thus maintained in wedging engagement between the inner walls of the sockets 11 and 12 and the surfaces of the shackle bolts 15 and 16 by virtue of the resilient pressure against the balls 29, which in turn tend to spread apart the larger ends of said bearing seats to increase the wedging pressure. In this way any wear on the bearing seats 24 and 25 is automatically compensated for. At the same time, the distance between the axes of the shackle bolts 15 and 16 remains unchanged with said axes disposed eccentrically with respect to these bearing sockets.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. In an eccentrically adjusted spring shackle, shackle bolts, wedge-shaped bearing seats therefor and a spring urged ball therefor tending to maintain said seats in wedging engagement with said bolts.

2. In an eccentrically adjusted spring shackle, bolts eccentrically positioned with respect to their housings, spaced wedge-shaped bearing seats for said bolts, a ball between the adjacent large ends of each bearing seat and resilient means acting against said balls to force said seat ends apart.

3. In an eccentrically adjusted spring shackle, bolts eccentrically positioned with respect to their housings, spaced wedge-shaped bearing seats for said bolts, a ball between the adjacent large ends of said bearing seats, said housings having extensions thereon for the reception of said balls and resilient means within said extensions acting against said balls to force said seat ends apart.

4. In an eccentrically adjusted spring shackle, a frame providing two pairs of spaced alined bearing sockets, shackle bolts eccentrically mounted within alined sockets, wedge-shaped arcuate bearing seats spaced about said bolts within each of said sockets, balls positioned between the inwardly inclined faces of adjacent larger ends of said seats and resilient means pressing against said balls to force said larger ends apart and maintain the bearing seats in wedging engagement with said bolts and the walls of said bearing sockets.

5. In an eccentrically adjusted spring shackle, a frame providing two pairs of spaced alined bearing sockets having cylindrical passaged extensions, shackle bolts eccentrically mounted within said alined sockets, wedge-shaped arcuate bearing seats spaced about said bolts within each of said sockets, balls positioned within said passaged extensions to project between the inwardly inclined faces of adjacent larger ends of said seats and resilient means pressing against said balls to force said larger ends apart and maintain the bearing seats in wedging engagement with said bolts and the walls of said bearing sockets.

6. In an eccentrically adjusted spring shackle, a frame providing two pairs of spaced alined bearing sockets having cylindrical passaged extensions, shackle bolts eccentrically mounted within said alined sockets, wedge-shaped arcuate bearing seats spaced about said bolts within each of said sockets, balls positioned within said passaged extensions to project between the inwardly inclined faces of adjacent larger ends of said seats, closure members for the outer ends of said passaged extensions and resilient means positioned within said passaged extensions and held under compression between said closure members and said balls pressing against said balls to force said larger ends apart and maintain the bearing seats in wedging engagement with said bolts and the walls of said bearing sockets.

In testimony whereof I have hereunto subscribed my name at Detroit, Wayne County, Michigan.

GEORGE H. HUFFERD.